US009191617B1

(12) United States Patent  
James et al.

(10) Patent No.: US 9,191,617 B1
(45) Date of Patent: Nov. 17, 2015

(54) USING FPGA PARTIAL RECONFIGURATION FOR CODEC APPLICATIONS

(71) Applicant: Altera Corporation, San Jose, CA (US)

(72) Inventors: Russell A. James, Little Chalfont (GB); Andrew M. Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 80 days.

(21) Appl. No.: 14/139,286

(22) Filed: Dec. 23, 2013

(51) Int. Cl.
*H04N 7/14* (2006.01)
*H04N 7/15* (2006.01)

(52) U.S. Cl.
CPC ..................... *H04N 7/152* (2013.01)

(58) Field of Classification Search
CPC ......... H04N 7/14; H04N 7/147; H04N 7/152; H04N 7/15; H04N 19/187; H04L 65/403
USPC ........ 326/39; 348/14.01, 14.05, 14.07, 14.08, 348/14.09; 375/240.1, 240.15; 716/126, 716/139; 141/1; 455/418, 452.1; 702/42; 703/16, 22; 713/310
See application file for complete search history.

(56) References Cited

U.S. PATENT DOCUMENTS

| | | | |
|---|---|---|---|
| 6,414,707 B1 * | 7/2002 | Agraharam et al. | 348/14.07 |
| 7,292,163 B1 | 11/2007 | Fedele | |
| 7,398,164 B2 * | 7/2008 | Ogushi et al. | 702/42 |
| 7,490,311 B1 * | 2/2009 | Payette | 716/138 |
| 7,565,280 B2 * | 7/2009 | Moriat | 703/22 |
| 7,581,124 B1 * | 8/2009 | Jacobson et al. | 713/310 |
| 7,765,512 B1 * | 7/2010 | Neuendorffer et al. | 716/117 |
| 7,823,117 B1 * | 10/2010 | Bennett | 703/13 |
| 7,941,777 B1 * | 5/2011 | Young et al. | 716/126 |
| 8,224,638 B1 * | 7/2012 | Shirazi et al. | 703/16 |
| 8,270,476 B2 * | 9/2012 | Schmit et al. | 375/240.1 |
| 8,345,082 B2 * | 1/2013 | Tysso | 348/14.08 |
| 8,686,753 B1 * | 4/2014 | Herrmann et al. | 326/39 |
| 8,688,095 B2 * | 4/2014 | Rice | 455/418 |
| 8,761,787 B2 * | 6/2014 | Chen et al. | 455/452.1 |
| 8,773,494 B2 * | 7/2014 | Barkley et al. | 348/14.07 |
| 8,873,628 B2 * | 10/2014 | Kim et al. | 375/240.15 |
| 8,910,109 B1 * | 12/2014 | Orthner | 716/139 |
| 2011/0265134 A1 | 10/2011 | Jaggi et al. | |
| 2012/0294367 A1 | 11/2012 | Ziauddin et al. | |
| 2014/0028778 A1 * | 1/2014 | Shapiro et al. | 348/14.01 |
| 2014/0083556 A1 * | 3/2014 | Darr et al. | 141/1 |
| 2014/0184731 A1 * | 7/2014 | Bebbington et al. | 348/14.09 |
| 2014/0218465 A1 * | 8/2014 | Bright-Thomas | 348/14.09 |
| 2015/0042747 A1 * | 2/2015 | Won | 348/14.05 |

* cited by examiner

*Primary Examiner* — Gerald Gauthier
(74) *Attorney, Agent, or Firm* — Weaver Austin Villeneuve & Sampson LLP

(57) ABSTRACT

Various embodiments of the present disclosure enable interoperability between multiple codecs of various standards, notwithstanding that the number and type of standards in use at any particular time may vary unpredictably. A control unit, for example, a multipoint control unit (MCU) of a videoconference system, includes a partially reconfigurable programmable logic device (PLD). The PLD may include a reconfigurable region and a non-reconfigurable portion. The non-reconfigurable portion may include logic blocks for performing codec operations that are common across at least two codec standards. A selected subset a number of personas may be instantiated within the reconfigurable region of the PLD, each persona of the selected subset being compatible with at least a portion of the associated codec of at least one communication channel. The MCU selects, from between two or more personas, the selected subset of personas to be used within the reconfigurable region of the PLD.

20 Claims, 7 Drawing Sheets

USING FPGA PARTIAL RECONFIGURATION FOR CODEC APPLICATIONS

TECHNICAL FIELD

The present disclosure generally relates to a programmable logic device (PLD) such as a field programmable gate array (FPGA) that may undergo partial reconfiguration, and, more particularly, to the application of such a PLD to codec applications such as in audio or video streaming, multicasting or conferencing.

BACKGROUND

A PLD is a semiconductor integrated circuit that contains logic circuitry that can be programmed ("designed") by a user to perform a host of logic functions. An FPGA is an example of a PLD that may benefit from the presently disclosed system design tools and techniques. An application specific integrated circuit (ASIC) that include one or more programmable sections is a further example of a PLD. The assignee of the present invention develops and manufactures PLDs including those that incorporate embedded processors, and complex programmable logic devices (CPLDs). These semiconductor integrated circuits, or chips, may be designed by a purchaser ("user") for use in the user's own electronic systems.

Normally, reconfiguring a designed PLD requires the PLD user to place the PLD in a reset mode while a controller is used to load a different design onto it. "Partial reconfiguration" of a PLD, as the term is used herein and in the claims, means making a change to a portion of a PLD while at least one other portion is still operating. Partial reconfiguration allows for some parts of the designed PLD to continue operating while a controller loads a partial design into another portion of the PLD. The controller may be within an operating portion of the PLD or within an external component. Thus, a "partially reconfigurable" PLD is a type of PLD that supports partial reconfiguration such that a portion of the partially reconfigurable PLD may be reconfigured while at least one other portion of the partially reconfigurable PLD is still operating.

Partial reconfiguration provides various benefits to the user, including reduction in the size, cost, and power consumption of the PLD and improved fault tolerance/reliability. For example, using a partial reconfiguration technique permits selectively powering down parts of a PLD, while the remainder of the PLD continues to operate normally.

PLDs have been developed that include logic for performing data encoding and decoding in the context of, for example, videoconferencing. A large number of codec standards have evolved and continue to be developed for encoding, decoding, compressing and decompressing video data streams. For example, MPEG2, MPEG4, H.263, H.264, VP6, VP8, Real, VC1/WMV9 are well known codec standards that may be employed by one or more videoconference participants. At least some participants of any particular videoconference may be participating from disparate physical and/or logical locations ("stations") that are communicatively coupled, directly or indirectly. In some implementations, the stations may be communicatively coupled by way of a network, for example, a local area network, a wide area network, the Internet, or the public switched telephone network, for example. A multipoint control unit (MCU) may provide interoperability between multiple participants notwithstanding that not all participants are necessarily using the same codec, or even a codec that is pre-identified to the MCU. As a result, the MCU may need to be capable of recognizing and appropriately responding, in real time, to a large number of codec standards.

In the absence of the present teachings, a requirement that the MCU be able to accommodate any of such a large number of codec standards may impose a significant burden on the processing capabilities of the MCU and adversely affect the cost and performance of the MCU. As a result, there is a need for techniques that reduce that burden.

SUMMARY OF INVENTION

The presently disclosed techniques enable interoperability between multiple codecs of various standards, notwithstanding that the number and type of standards in use at any particular time may vary unpredictably. A control unit, for example, a multipoint control unit (MCU) of a videoconference system, includes a partially reconfigurable programmable logic device (PLD). The PLD may include a reconfigurable region and a non-reconfigurable portion. The non-reconfigurable portion may include logic blocks for performing codec operations that are common across at least two codec standards. Such logic blocks and/or other logic blocks in the non-reconfigurable portion of the PLD may, in some implementations, be hardwired. A selected subset of a number of personas may be instantiated within the reconfigurable region of the PLD, each persona of the selected subset being compatible with at least a portion of the associated codec of at least one communication channel. The MCU selects, from between two or more personas, the selected subset of personas to be used within the reconfigurable region of the PLD.

In some implementations, an apparatus communicates data with at least two stations, where the apparatus includes at least one communication channel for each respective station, a programmable logic device (PLD), and a control unit. Data carried within each communication channel is compressed in accordance with an associated codec standard, the codec standard being at least partially selected in view of characteristics of the respective station. The PLD is partially reconfigurable. The control unit selects between two or more personas to be used within a reconfigurable region of the PLD, wherein the control unit partially reconfigures the PLD by instantiating a subset of the two or more personas, each persona within the subset being compatible with at least a portion of the associated codec of at least one communication channel.

In some implementations, a PLD includes a partial reconfig (PR) domain, the PR domain including a partitioned reconfigurable region of the PLD that is selectably configurable as any of at least two personas. The PLD includes logic blocks for encoding or decoding video data in compliance with a plurality of codec standards, a first subset of the logic blocks being located outside the PR domain, the first subset being compliant with each codec standard of the plurality of codec standards. Each persona includes at least one logic block compliant with at least a portion of at least one of the plurality of codec standards, the at least one logic block being part of a second subset of logic blocks, the second subset excluding the first subset of logic blocks.

In some implementations, a method for communicating data with a plurality of stations includes receiving, at a multipoint control unit (MCU) for a videoconference system, a request to join a videoconference, the request being associated with at least one of the plurality of stations. The MCU includes at least one communication channel for each respective station, a partially reconfigurable PLD, and a control unit that selects between two or more personas to be used within a reconfigurable region of the PLD, each persona within the subset being compatible with at least a portion of the associated codec of at least one communication channel. The method further includes selecting, with the MCU, for each communication channel, an associated codec standard for compressing data, the associated codec standard being at least partially selected in view of characteristics of a respective station, and partially reconfiguring the PLD, with the control unit, by instantiating a subset of the two or more personas.

These and other features will be presented in more detail in the following specification of the invention and the accompanying figures, which illustrate by way of example the principles of the invention.

BRIEF DESCRIPTION OF THE DRAWINGS

The included drawings are for illustrative purposes and serve only to provide examples of possible implementations of the disclosed inventive techniques. These drawings in no way limit any changes in form and detail that may be made by one skilled in the art without departing from the spirit and scope of the disclosed implementations.

Figure 1:
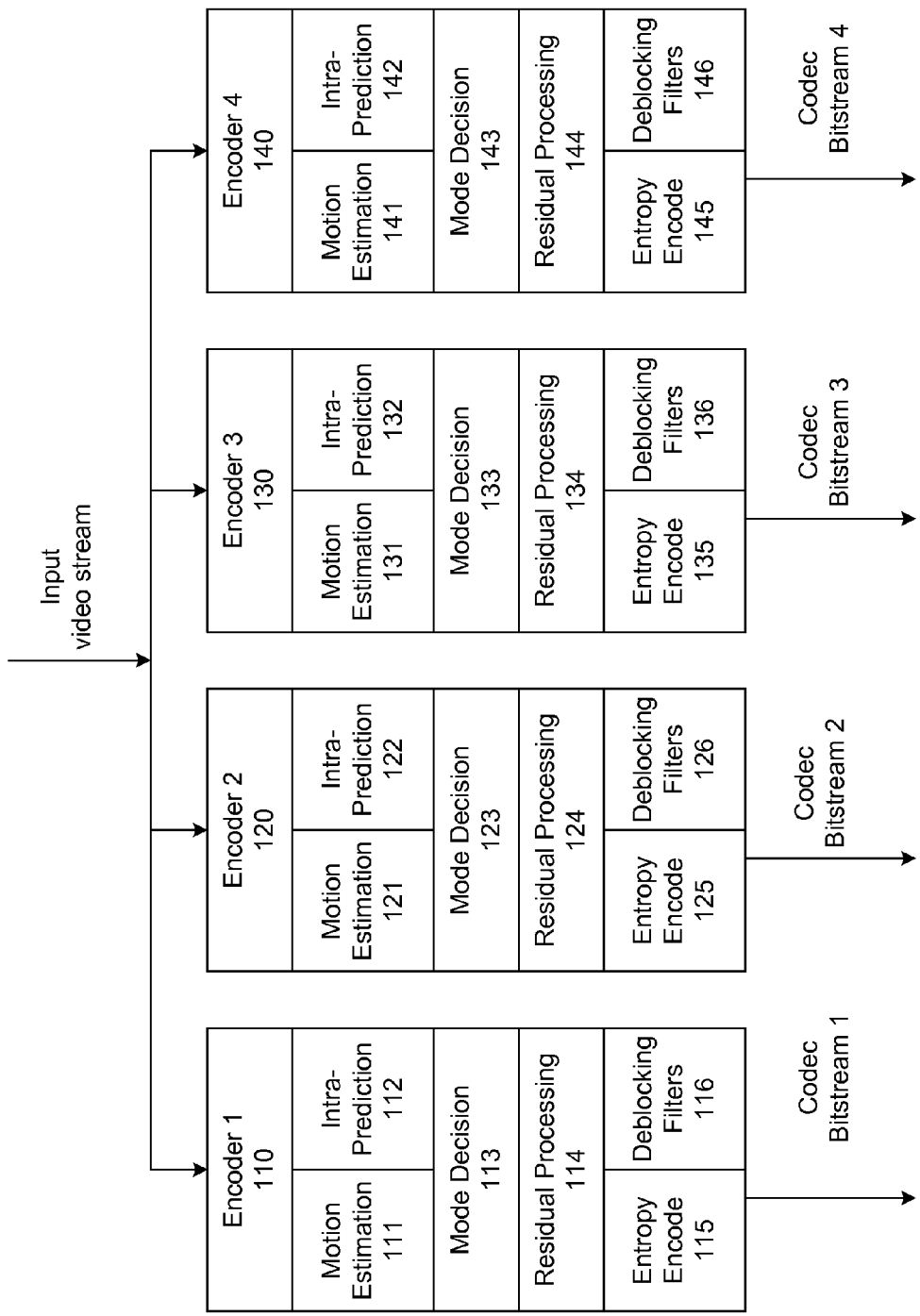
FIG. 1 illustrates how a multichannel encoder within a multipoint control unit (MCU) may process parallel streams of participant video data.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the disclosed subject matter, as defined by the appended claims.

DETAILED DESCRIPTION

Reference will now be made in detail to embodiments of the present invention. Examples of these embodiments are illustrated in the accompanying drawings. While the invention is described in conjunction with these embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular types of devices. However, it should be noted that the techniques and mechanisms of the present invention apply to a variety of different types of devices. In the following description, numerous specific details are set forth in order to provide a thorough understanding of the present invention. Particular exemplary embodiments of the present invention may be implemented without some or all of these specific details. In other instances, well known process operations have not been described in detail in order not to unnecessarily obscure the present invention.

Various techniques and arrangements of the present invention will sometimes be described in singular form for clarity. However, it should be noted that various embodiments may include multiple iterations of a technique or multiple instantiations of a mechanism unless noted otherwise. For example, a system may use a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to a memory component, but it will be appreciated that a variety of bridges and controllers may reside between the processor and memory. Consequently, a connection does not necessarily mean a direct, unimpeded connection unless otherwise noted.

As used herein, and in the claims, the term "PLD" means a programmable logic device such as, for example, an FPGA or any other programmable hardware on a chip.

The present disclosure relates to improved solutions for providing interoperability between multiple codecs of various standards, particularly where the number and type of standards in use at any particular time may vary unpredictably. For illustrative purposes, an implementation related to a video teleconferencing environment will be described. However, other applications are within the contemplation of the present disclosure. For example, the present teachings may be applicable to a communication network where a where a hub, or master communication node including a PLD must communicate with a variety of satellite, or slave, communication nodes, the satellite nodes being compatible with different codecs standards.

In a video teleconferencing environment, it is known to provide a multipoint control unit (MCU) having multiple channels and capable of simultaneously interfacing with multiple participants. Each participant may be communicating, via the MCU, with other users. Each participant may send and receive data, for example, streaming video data, to and from the MCU. The video data stream may ordinarily be compressed and/or encoded in accordance with a codec standard. The codec standard used by a participant will ordinarily be determined by features of the participant's user terminal or workstation ("station"). For example, the age and processing capabilities of the participant's station hardware and/or software may determine in large part the quantity and types of codecs with which that station is operable. As a result, when establishing a videoconference, the MCU is required to negotiate with each participant's station certain communications protocols, including the codec (or codecs) that may be recognized by that participant's station.

To enable a videoconferencing environment for a wide range of participants, it is preferable that the MCU and associated centralized processes, avoid unnecessarily constraining the codecs used by participants. In other words, as wide a range as possible of standard codecs should be supported by the MCU.

Referring to FIG. 1, for example, an illustration is provided of how a multichannel encoder 100 within an MCU may process parallel streams of participant video data. In the illustrated example, input video data 101 is channelized into each of four channels, each channel including a separate encoder. As may be necessary to meet a participant station requirement, a first encoder 110 may be operable in compliance with the MPEG-2 standard, for example; a second encoder 120 may be operable in compliance with the H.263 standard, a third encoder 130 may be operable in compliance with the H.264 standard; and a fourth encoder 140 may be operable in compliance with the HEVC standard. It will be appreciated that although FIG. 1 illustrates four channels, a fewer or larger number of channels may be contemplated. For example, a multichannel encoder supporting several tens of channels is within the contemplation of the present disclosure.

Referring still to FIG. 1, it will be appreciated that each of encoders 110, 120, 130, and 140 include logic blocks for performing certain tasks required by an associated codec standard. For example, each codec standard may require functionality performed by a motion estimation block (111, 121, 31, 141), an intra-prediction block (112, 122, 132 and 142), a mode decision block (113, 123, 133, and 143), a residual processing block (114, 124, 34, and 144), an entropy encoding block (115, 125, 135, and 145), and a deblocking filter block (116, 126, 136, and 146). Irrespective of the codec standard being complied with, each encoder executes the above-mentioned logic blocks, which have been generically identified based on function (motion estimation, intra-prediction, mode decision, residual processing, entropy encoding, filtering). It will be appreciated, however, that the actual content of each logic block may vary from encoder to encoder, to a greater or lesser extent, as required for each coder to comply with its respective codec standard.

Figure 2:
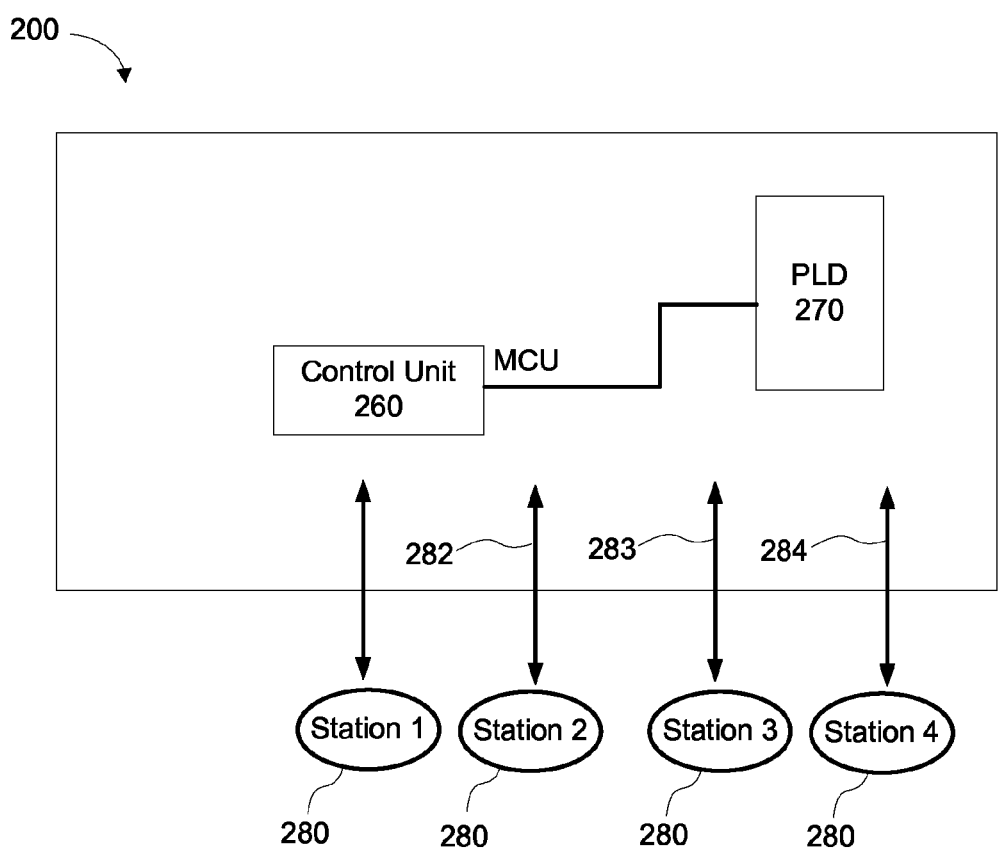
FIG. 2 illustrates a simplified block diagram of an MCU 200, in accordance with an implementation.

Referring now to FIG. 2, a simplified block diagram of an MCU 200 is illustrated. MCU 200 includes control unit 260 and PLD 270 and may be communicatively coupled with two or more participants in a videoconference. Each participant may be associated with a station which, in some implementations may represent a physical and/or logical location within a network. In the illustrated implementation, four stations 280 are identified, but it will be appreciated that a greater or lesser number of stations may be contemplated.

Each station 280 may send and receive video data, for example, via a respective communication channel from and to MCU 200. In the illustrated implementation, MCU 200 includes first communication channel 281, second communication channel 282, third communication channel 283, and fourth communication channel 284. Data carried within each communication channel may be encoded in accordance with a respective codec standard. The determination of which codec standard should be applied to data carried within a particular communication channel may ordinarily be made in view of characteristics of the respective station. For example, during a process of participant requirement negotiation carried out between each respective station and the MCU, the station may identify to the MCU one or more codec standards with which the station is compatible. As a further example, a codec standard may be selected at the time a station joins a videoconference.

In some implementations, PLD 270 may perform various encoding and decoding operations in compliance with various standard codecs, under direction of control unit 260. Advantageously, PLD 270 may be partially reconfigurable.

Figure 3:
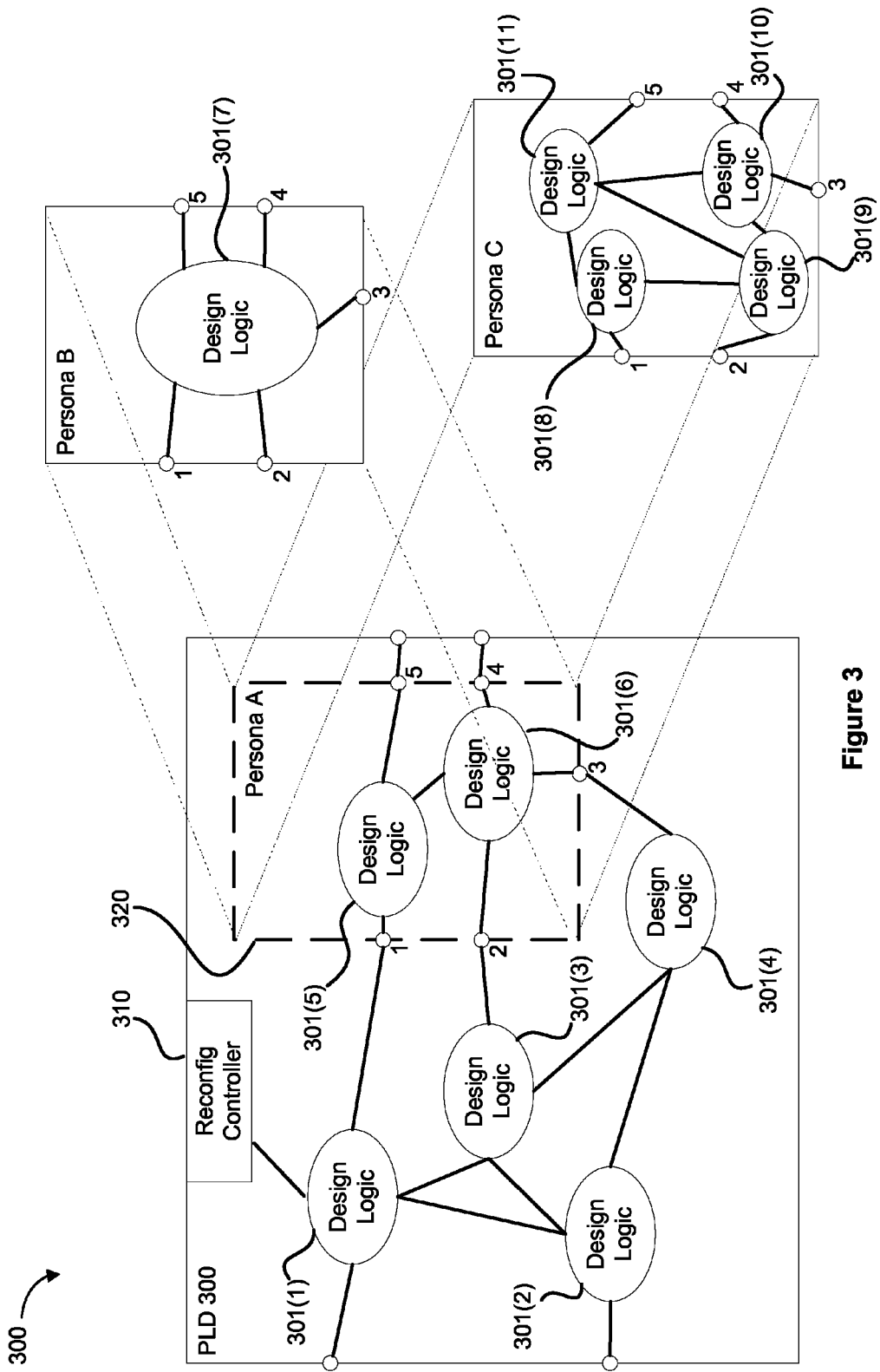
FIG. 3 illustrates a programmable logic device (PLD) that supports partial reconfiguration.

A better understanding of the term partially reconfigurable may be obtained by referring to FIG. 3, which illustrates a PLD 300 configured to support partial reconfiguration. In the illustrated implementation, PLD 300 has been designed to include design logic modules 301(1), 301(2), 301(3), and 301(4) and reconfig controller 310 located outside a partitioned region 320. Partitioned region 320 may include one or more design logic modules and may be reconfigurable as described hereinbelow. In the illustrated implementation, partitioned region 320 is shown to have interfaces at points 1, 2, 3, 4, and 5 with elements of the PLD 300 that are outside the partitioned region 320. The contents of the region 320 may be referred to herein as a "persona". Thus, in the illustrated implementation, Persona A includes design logic modules 301(5) and 301(6) and is operatively coupled to interface points 1, 2, 3, 4, and 5. Persona B is includes design logic modules 301(7) and is likewise operatively coupled to interface points 1, 2, 3, 4, and 5. Persona C includes design logic modules 301(8), 301(9), 301(10), and 301(11), and is likewise operatively coupled to interface points 1, 2, 3, 4, and 5.

In some implementations, partial reconfiguration of PLD 300 may be performed under control of reconfig controller 310, while the PLD 300, outside partitioned region 320, is fully or partially operating. More particularly, for example, Persona A may be replaced with Persona B or with Persona C.

Advantageously, referring again to FIG. 2, control unit 260 may select between a number of personas that may be selectively incorporated within PLD 270. In some implementations, control unit 260 may interface with reconfiguration controller 310, so as to partially reconfigure PLD 270. For example, control unit 260 may identify a particular subset of personas, each persona within the subset being compatible with at least a portion of a codec associated with at least one communication channel.

Figure 4:
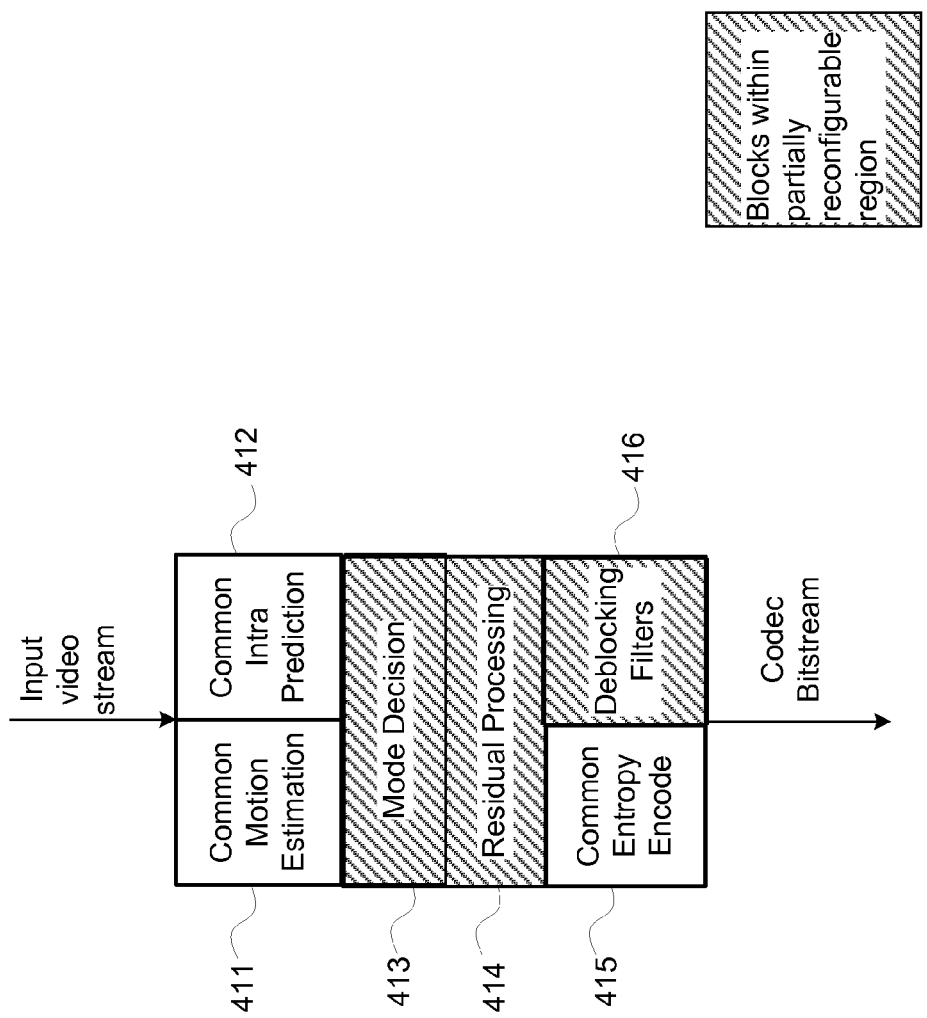
FIG. 4 illustrates an example implementation of partial reconfiguration as applied to an encoder design.

Referring now to FIG. 4, an example implementation of partial reconfiguration as applied to an encoder design will be described. An encoder 400 may include a number of modules, or logic blocks, that relate to various codec operations. Similar to the encoders illustrated in FIG. 1, encoder 400 may include a motion estimation block 411, an intra-prediction block 412, a mode decision block 413, a residual processing block 414, an entropy encoding block 415 and a deblocking filter block 416. The present inventor has appreciated that certain of the above-mentioned logic blocks may be at least largely common for multiple codecs standards. For at least a substantial subset of codec standards of interest, for example, a respective common logic block may be used to perform at least a substantial part of the codec operations associated with motion estimation (logic block 411), intra-prediction (logic block 412) and/or entropy encoding (logic block 415). Contrariwise, logic blocks associated with mode decision (logic block 413), residual processing (logic block 414) and deblocking filters (logic block 416) may require separate selection based on the codec standard with which a particular encoder is required to comply.

Figure 5:
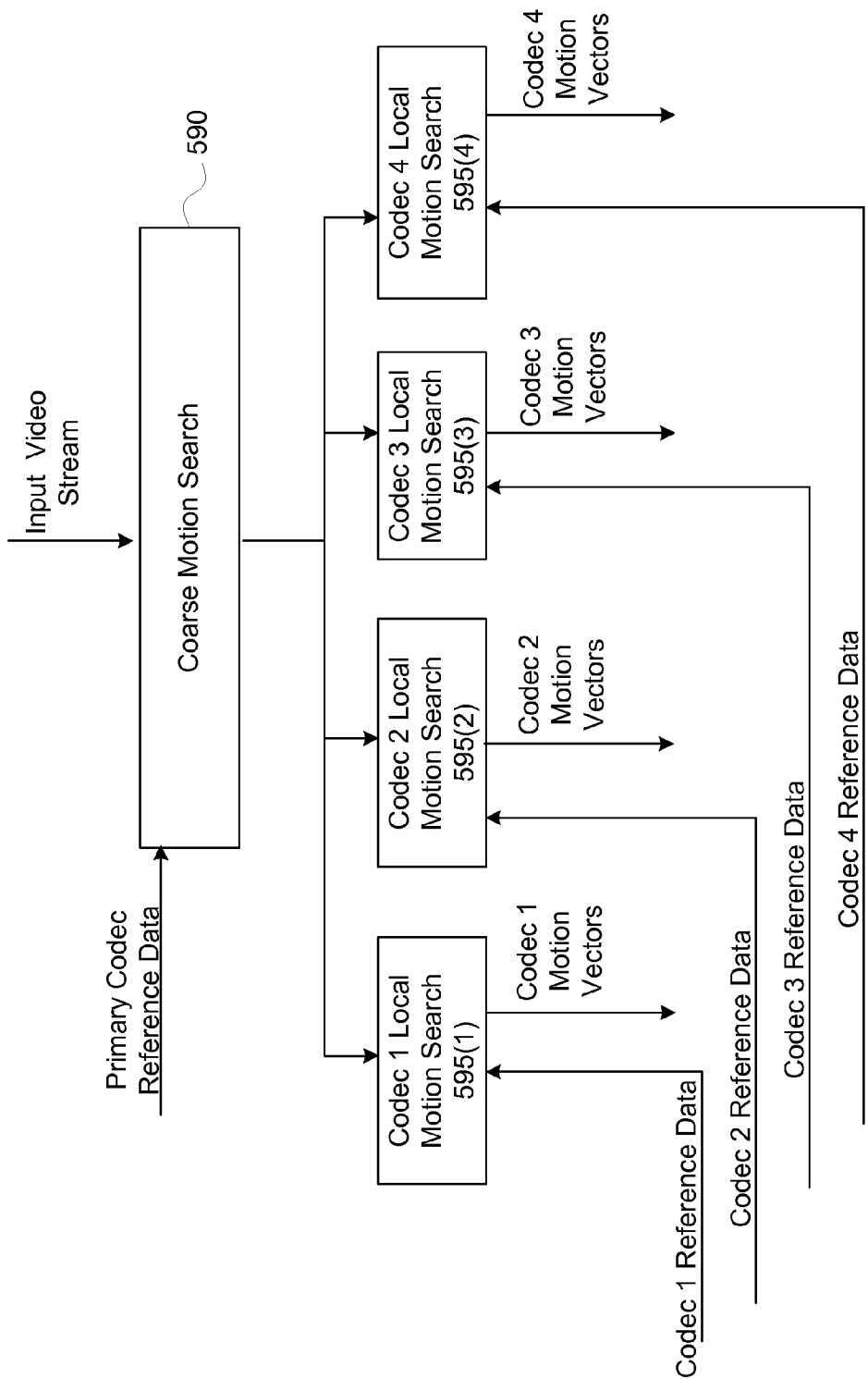
FIG. 5 illustrates a common logic block for performing codec operations associated with motion estimation.

An example of a common logic block for performing codec operations associated with motion estimation is illustrated in FIG. 5. In the illustrated implementation, selected operations associated with motion estimation block 411 that are common across Codec 1, Codec 2, Codec 3 and Codec 4 may be performed by block 590. More particularly, in the illustrated implementation, block 590 may, on a frame by frame basis, for example, compare input video stream data with reference data provided by a selected primary codec to obtain coarse motion estimation data for each of the four codecs. Block 590 may use the comparison to perform a course motion search (which may also be referred to as a hierarchical motion search). Advantageously, this operation may be performed simultaneously for all codecs. Outputs from block 590 may be processed separately for each codec at blocks 595($i$). Each block 595($i$) may perform a local motion search in accordance with a respective specification associated with each individual codec.

Advantageously, an encoder may be implemented in the PLD 270 such that logic blocks for motion estimation, intra-prediction and entropy encoding are located external to the reconfigurable region of the PLD 270, whereas logic blocks for mode decision, residual processing and deblocking filters are located within the reconfigurable region of the PLD 270.

In accordance with the present teachings, logic blocks associated with mode decision, residual processing and deblocking filters are located within the reconfigurable region of the PLD 270 and instantiated on an "as needed" basis. For example, during negotiation with a participant station, control unit 260 of MCU 200 may instantiate such logic blocks within the reconfigurable region of the PLD 270. More particularly, when the MCU 200 determines a codec standard that is to be associated with the station, control unit 260 may cause logic blocks associated with mode decision, residual processing and deblocking filters compliant with that codec standard to be instantiated within the reconfigurable region of the PLD 270.

Figure 6:
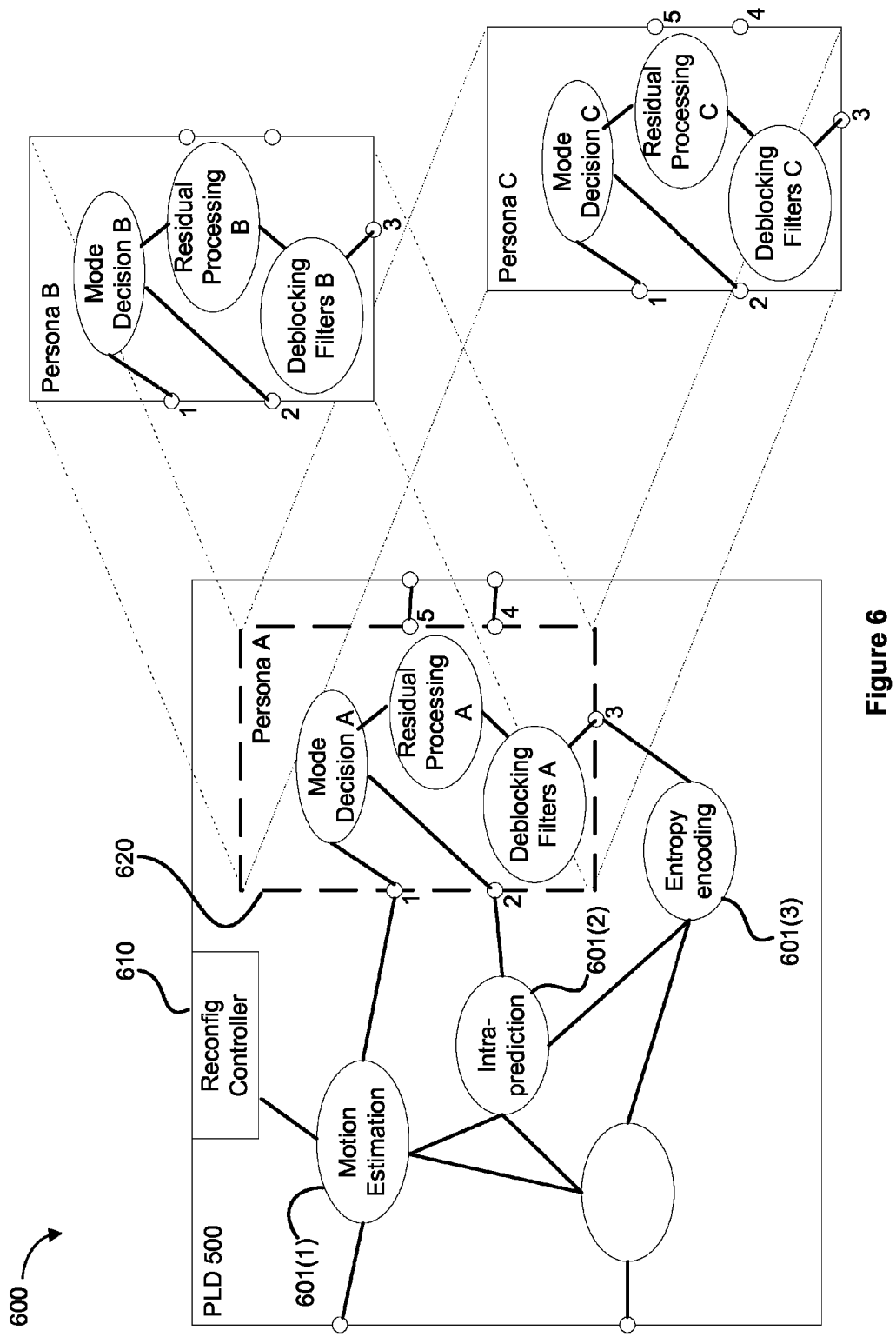
FIG. 6 illustrates an example of a reconfigurable PLD in accordance with an implementation.

FIG. 6 illustrates an example of the above-described implementation. In the illustrated implementation, a PLD 600 includes a reconfigurable region 620. The PLD 600 may include, outside of the reconfigurable region 620, logic block 601(1) related to motion estimation, logic block 601(2) related to intra-prediction, and logic block 601(3) related to entropy encoding. Advantageously, the reconfigurable region 620 may be instantiated with two or more personas. In the illustrated example, a first persona, Persona A, a second persona, Persona B, and a third persona, Persona C, are illustrated. It will be appreciated, however, that any number of personas may be contemplated. Advantageously, each persona may be associated with a respective codec standard. For example, Persona A may be associated with the MPEG-2 standard, Persona B may be associated with the H.263 standard, and Persona C may be associated with the HEVC standard. In such an implementation, it will be appreciated that each of logic blocks Mode Decision A, Residual Processing A, and Deblocking Filters A will be in compliance with the MPEG-2 standard. Similarly, each of logic blocks Mode Decision B, Residual Processing B, and Deblocking Filters B will be in compliance with the H.263 standard. Moreover, each of logic blocks Mode Decision C, Residual Processing C, and Deblocking Filters C will be in compliance with the HEVC standard.

In accordance with the above-described implementation, reconfig controller 610 may, upon receipt of an instruction from control unit 260, reconfigure the reconfigurable region 620 such that a persona appropriate to a particular codec is instantiated. In some implementations, for example, a configuration image file, in the form of a bitstream, for example, may be received from control unit 260 and used to reconfigure the reconfigurable region of PLD 600.

Advantageously, in accordance with the presently disclosed techniques, only those personas that are actually needed to support of the participants of a particular videoconference will be instantiated in reconfigurable region 620. As a result, the burden of continuously supporting all codecs standards is reduced with consequential reduction in the cost and power of the MCU.

Figure 7:
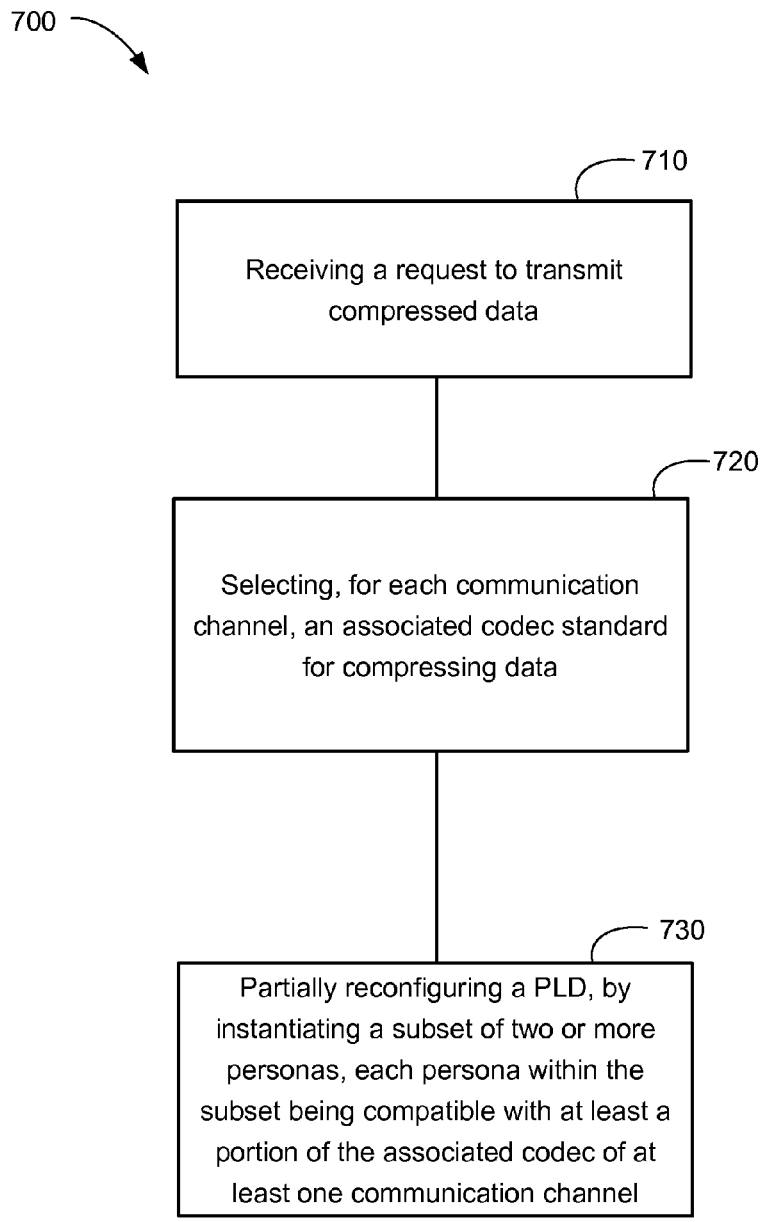
FIG. 7 illustrates a process flow diagram of an example method for communicating data with a plurality of stations, according to one implementation.

Referring now to FIG. 7, a process flow diagram is illustrated of a method 700 for communicating data with a plurality of stations, according to an implementation. The method 710 may begin at step 710, by receiving at an MCU for a videoconference system a request to transmit compressed data. The request may be originated by, or otherwise associated with, one of the stations. In some implementations each of the plurality of stations may be a user terminal or worksta-tion utilized by one or more participant in a video teleconference ("videoconference"). In other implementations, the request may be originated from a station at which a participant desires to receive compressed audio or video data.

In some implementations, the MCU may include at least one communication channel for each respective workstation, a partially reconfigurable PLD, and a control unit. The control unit may select between two or more personas to be used within a reconfigurable region of the PLD. The control unit may partially reconfigure the PLD by instantiating a subset of the two or more personas. Advantageously, each persona within the subset is compatible with at least a portion of the associated codec of at least one communication channel.

At step 720, associated codec standard for compressing data may be selected for each communication channel. The associated codec standard being may be at least partially selected in view of characteristics of a respective station. For example, during a negotiation phase between the MCU and each station, the station may identify the one or more codec standards with which the station is compatible, and the MCU may select from among those compatible codecs standards.

At step 730, the PLD may be partially reconfigured. More particularly, a subset of the two or more personas may be instantiated within the reconfigurable region of the PLD. In some implementations, each persona within the subset is compatible with at least a portion of the associated codec of at least one communication channel.

Thus, improved techniques have been disclosed for communicating data with a plurality of stations where a codec functionality is provided by a partially reconfigurable PLD.

Although the foregoing systems and methods have been described in detail by way of illustration and example for purposes of clarity and understanding, it will be recognized that the above described systems and methods may be embodied in numerous other variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. An apparatus that communicates data with at least two stations, the apparatus comprising:
   at least one communication channel for each respective station, data carried within each communication channel being compressed in accordance with an associated codec standard, the codec standard being at least partially selected in view of characteristics of the respective station;
   a programmable logic device (PLD), the PLD being partially reconfigurable; and
   a control unit that selects between two or more personas to be used within a reconfigurable region of the PLD, wherein the control unit partially reconfigures the PLD by instantiating a subset of the two or more personas, each persona within the subset being compatible with at least a portion of the associated codec of at least one communication channel.

2. The apparatus of claim 1, wherein the apparatus is a multipoint control unit (MCU) for a videoconference system.

3. The apparatus of claim 1, wherein the associated codec standard is determined during a process of participant requirement negotiation carried out between the station and the control unit.

4. The apparatus of claim 1, wherein the associated codec standard is selected when a station joins a videoconference.

5. The apparatus of claim 1, wherein the PLD includes a non-reconfigurable portion, the non-reconfigurable portion including logic blocks for performing codec operations that are common across at least two codec standards.

6. The apparatus of claim 5, wherein the non-reconfigurable portion includes logic blocks for performing motion estimation, intra-prediction and entropy encoding.

7. The apparatus of claim 1, wherein each persona includes logic blocks for at least one of mode decision, residual processing and deblocking filters.

8. A programmable logic device (PLD) including a partial reconfig (PR) domain, the PR domain including a partitioned reconfigurable region of the PLD that is selectably configurable as any of at least two personas, wherein:
- the PLD includes logic blocks for encoding or decoding audio or video data in compliance with a plurality of codec standards, a first subset of the logic blocks being located outside the PR domain, the first subset being compliant with each codec standard of the plurality of codec standards, and
- each persona includes at least one logic block compliant with at least a portion of at least one of the plurality of codec standards, the at least one logic block being part of a second subset of logic blocks, the second subset excluding the first subset of logic blocks.

9. The PLD of claim 8, wherein the first subset of logic blocks includes logic blocks for performing motion estimation, intra-prediction and entropy encoding.

10. The PLD of claim 8, wherein the second subset of logic blocks includes logic blocks for at least one of mode decision, residual processing and deblocking filters.

11. The PLD of claim 8, wherein the PLD is reconfigurable by a multipoint control unit (MCU) of a videoconference system, the videoconference system including at least two stations, the MCU including at least one communication channel for each respective station, data carried within each communication channel being compressed in accordance with an associated codec standard, wherein:
- the MCU selects between the at least two personas and partially reconfigures the PLD by instantiating a subset of the at least two personas, each persona within the subset being compatible with at least a portion of the associated codec of at least one communication channel.

12. The PLD of claim 11, wherein the associated codec is determined during a process of user requirement negotiation carried out between the station and the control unit.

13. A method for communicating data with a plurality of stations, the method comprising:
- receiving, at a multipoint control unit (MCU), a request to transmit compressed data, the request being associated with at least one of the plurality of stations; wherein the MCU includes:
  - at least one communication channel for each respective station;
  - a programmable logic device (PLD), the PLD being partially reconfigurable; and
  - a control unit that selects between two or more personas to be used within a reconfigurable region of the PLD;
- selecting, with the MCU, for each communication channel, an associated codec standard for compressing data, the associated codec standard being at least partially selected in view of characteristics of a respective station; and
- partially reconfiguring the PLD, with the control unit, by instantiating a subset of the two or more personas each persona within the subset being compatible with at least a portion of the associated codec of at least one communication channel.

14. The method of claim 13 wherein the associated codec is determined during a process of user requirement negotiation carried out between the station and the control unit.

15. The method of claim 13, wherein the associated codec is determined upon a station joining a videoconference.

16. The method of claim 13, wherein the PLD includes a non-reconfigurable portion, the non-reconfigurable portion including logic blocks for performing codec operations that are common across at least two codec standards.

17. The method of claim 13, wherein the non-reconfigurable portion includes logic blocks for performing motion estimation, intra-prediction and entropy encoding.

18. The method of claim 13, wherein each persona includes logic blocks for at least one of mode decision, residual processing and deblocking filters.

19. The method of claim 13, wherein the MCU's associated with the video conferencing system.

20. The method of claim 13, further comprising transmitting compressed data to the at least one station.

* * * * *